United States Patent [19]
Garrard

[11] 3,958,596
[45] May 25, 1976

[54] FLOW REGULATOR

[76] Inventor: Bruce Garrard, 126 Montgomery Ferry Drive NE., Atlanta, Ga. 30309

[22] Filed: July 10, 1974

[21] Appl. No.: 487,015

Related U.S. Application Data

[63] Continuation-in-part of Ser. No. 363,304, May 23, 1973, abandoned.

[52] U.S. Cl.............................. 137/504; 137/517
[51] Int. Cl.² ....................................... F16K 31/12
[58] Field of Search ........... 137/501, 504, 517, 537, 137/498; 138/45, 43

[56] References Cited
UNITED STATES PATENTS

| | | | |
|---|---|---|---|
| 805,146 | 11/1905 | Lord | 137/504 |
| 2,351,035 | 6/1944 | Grant, Jr. et al. | 137/504 |
| 2,601,654 | 6/1952 | Wright | 137/517 |
| 2,668,555 | 2/1954 | Bartolat | 137/498 |
| 2,752,212 | 11/1955 | Jensen | 251/122 |
| 3,023,591 | 3/1962 | Tilney | 137/501 |
| 3,331,389 | 7/1967 | Kirk | 137/517 |
| 3,351,086 | 11/1967 | Baker | 137/501 |
| 3,431,944 | 3/1969 | Sakuma | 137/504 |
| 3,444,885 | 5/1969 | Sanchez | 137/504 |
| 3,464,439 | 9/1969 | Budzich | 137/504 |
| 3,762,433 | 10/1973 | Moore | 137/504 |

*Primary Examiner*—Martin P. Schwadron
*Assistant Examiner*—George L. Walton

[57] ABSTRACT

A flow regulator is shown with the inlet aligned with the outlet and with external adjustment of the flow rate accomplished by movement of either the inlet or outlet fitting relative to the main body. A plunger and specially shaped stem regulate flow by engagement of the stem with an outlet hole, the shape of the stem being determined for a particular flow rate and correlated with the area of the outlet hole and the load per inch deflection characteristic of the spring, which biases the plunger toward the inlet, to give a constant rate of flow regardless of wide changes in supply pressure across the regulator. A compression gland, comprising an O-ring, washers and nut, affords locking means for the adjustable outlet.

1 Claim, 2 Drawing Figures

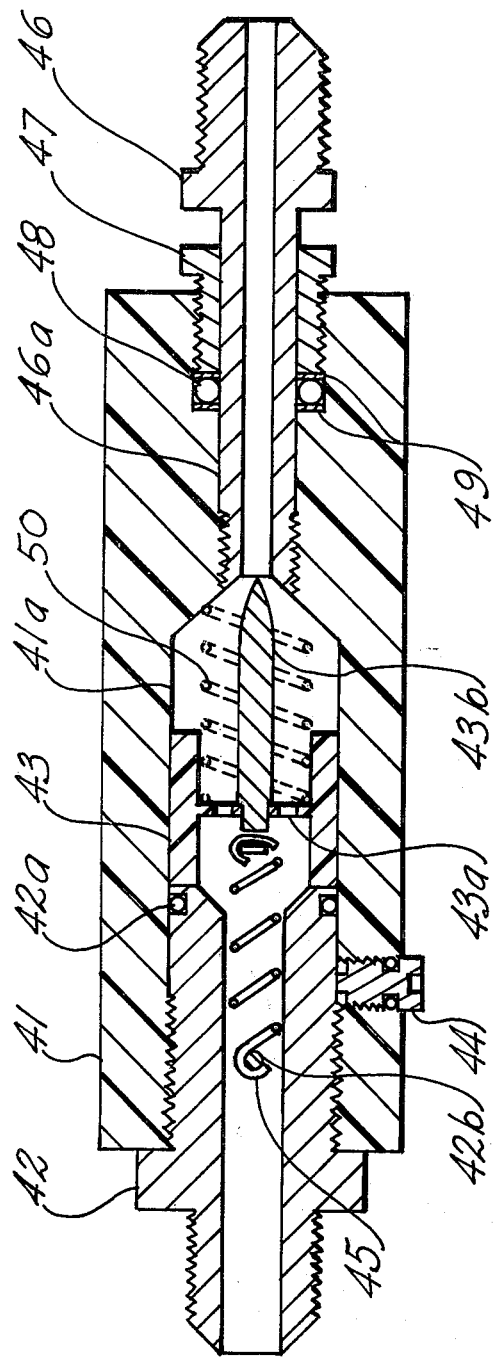
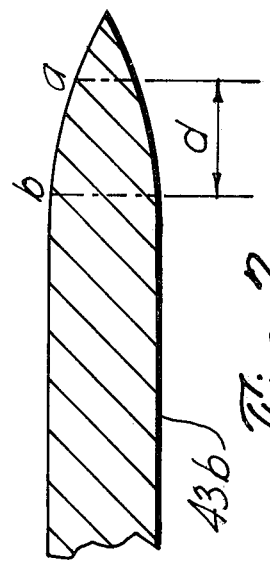
Fig. 1
Fig. 2

FLOW REGULATOR

This application is a continuation-in-part of my application on Flow Regulator, Ser. No. 363,304 filed May 23, 1973, now abandoned.

SUMMARY AND BACKGROUND

The proposed design is not intended as a commercial flow regulator to fill a wide variety of needs and a wide choice of flow rates in a single design. Rather it has special features to fit it to special aplications, such as use in a fountain dispenser for soft drinks to control the rate of flow of syrup and water. In such an application its limitations are minimal and its advantages over more conventional designs are considerable from the standpoints of utility, convenience and cost.

For example, the conventional regulator comprising a polished piston operating in a polished cylinder to open or close outlet holes in the cylinder wall is well designed to afford flow rates over a wide range of choice. However, only a narrow range of flow rates is required in a particular soft drink dispenser, perhaps plus or minus 10% from a standard rate for syrup, to afford some choice toward a sweeter or less sweet drink than standard. The proposed design affords the required range for such an application at low cost, without providing an unnecessarily wide choice at much higher cost.

The proposed design has the inlet and outlet fittings axially aligned with each other, for convenience in installation at any point in the dispensing system, while at the same time affording external adjustment of the flow rate without disturbing the connecting lines. Previous designs having the inlet and outlet fittings aligned with each other, and which were adjustable, required disconnection of a line for internal adjustment of the flow rate.

Adjustment of the flow rate is especially convenient in the proposed design by movement of the outlet fitting. A special compression gland, comprising an O-ring, nut and washers, maintains a seal against leakage during adjustment and affords firm locking of the outlet fitting when the comression nut is tightened. Compression of the O-ring causes a strong bond between the rubber O-ring and the metal stem of the outlet fitting and thus secures the adjustment. Such a convenient arrangement has not been found in the prior art. The inlet fitting is also adjustable in the proposed design to vary the flow rate, although care must be taken to keep the main body of the regulator oriented in a way to have the set screw accessible after adjustment in order to lock the fitting in place. Such care is not required with the compression gland, the nut being accessible regardless of how the regulator body is turned on its longitudinal axis.

A special problem attending the use of a plunger that moves in response to flow to partially close an outlet hole axially aligned with it, such as in this design, has been noted in the prior art — namely, a force acting on a small area of the plunger, the force being equal to the product of the overall pressure drop across the regulator and the area of the outlet hole. This force is in addition to the force on the plunger due to flow and tends to decrease the flow rate below the rate desired as the pressure drop increases across the regulator, giving what is known in the art as negative regulation. One obvious solution is the use of a relatively large plunger and relatively small outlet hole to minimize the force due to overall pressure drop compared to that due to flow. One previous design, using a large diaphragm instead of a plunger, did just this. Such a solution, however, is far from ideal if compactness for a given flow rate is important.

In the proposed design a unique solution to this problem has been found that permits use of a relatively small plunger and relatively large outlet hole. The plunger stem is shaped, for a particular flow rate midway of a limited range, in coordination with the area of the outlet hole and the load per inch characteristics of the spring to compensate for this force. A constant flow rate, within the limited design range, can thereby be maintained over a wide range of pressure, while maintaining optimum compactness of design for a given flow rate. No such optimum results appear to have been achieved in the prior art.

BRIEF DESCRIPTION OF THE DRAWINGS

For a better understanding of the invention reference is now made to the drawings.

FIG. 1 is a longitudinal sectional view of the preferred embodiment.

FIG. 2 is an enlarged sectional view of the tapered end of plunger stem 43b as shown in FIG. 1.

DESCRIPTION OF THE PREFERRED EMBODIMENT

Referring again to FIG. 1, flow enters at the left end through inlet fitting 42, which is preferably stainless steel, and is threaded and installed in main body 41, preferably of a plastic such as Delrin. An O-ring 42a and set screw 44 provide means for sealing against leakage and locking the inlet fitting in place after adjustment to a chosen position. A plunger 43, preferably of Delrin, is slidable in bore 41a and has two orifices 43a through which flow proceeds from left to right. Plunger stem 43b is preferably of stainless steel and is pressed into the web of plunger 43, operating integrally with it. A tension spring 45 is attached to the left end of stem 43b and to metal pin 42b, which is pressed into a cross-drilled hole in inlet fitting 42, biasing the plunger 43 and stem 43a toward the inlet. A compression spring 50, shown dotted, may be used alternatively to the tension spring 45 if the inlet fitting is not to be used for adjustment of the flow rate. Outlet fitting 46 has a threaded stem portion 46 a and an outlet bore shown aligned with plunger stem 43b. O-ring 48, washers 49 and compression nut 47 compose a compression gland to lock and seal the outlet fitting. The rubber O-ring being deformable but non-compressible, a great force is created when nut 47 is tightened further after all the void space is filled by the compressed and deformed O-ring between the washers. The high friction between the O-ring and the metal stem 46a provides a very effective seal lock to preserve the adjustment of fitting 46.

Flow through orifices 43a is induced by a pressure drop across plunger 43 from left to right that tends to move the plunger 43 and stem 43b to the right against the spring bias 45, causing a partial closing of the left end of the outlet hole in fitting 46, tending to limit flow to a chosen rate, which may be adjusted by movement of either fitting, 42 or 46, outward from body 41 to increase flow, or inward to decrease flow.

In addition to the force on plunger 43 due to flow there is a second force to the right on plunger 43 caused by the operation of the overall pressure drop across the regulator on an area of the plunger equal to the area A of the outlet hole in fitting 46. At overall pressure drop $P_1$ this force will equal $P_1A$. If the pressure drop is increased to $P_2$ the force will then equal $P_2A$.

In FIG. 2, showing an enlargement of contoured end of stem 43b, it can be understood how the contour shape is found that will give a constant flow rate that remains the same for pressures $P_1$ and $P_2$. Section $a$ represents the proper diameter of 43b, which can be determined experimentally, that will give a desired flow rate R when that section is closest to the left end of the outlet hole in fitting 46. The diameter at section $b$ can be similarly determined for increased pressure drop $P_2$. Now since the same flow rate R will occur when section $a$ is closest to the outlet hole entrance at pressure drop $P_1$ or when section $b$ is closest to the outlet hole entrance at pressure drop $P_2$, the force on the plunger due to flow will remain the same and the plunger stem will move a distance $d$, as shown in FIG. 2, which is totally due to the increase in overall pressure drop from $P_1$ to $P_2$. This increase in force is equal to $(P_2 - P_1)A$ and if it operates on a spring of known load per inch characteristic L the distance $d$ equals $(P_2 - P_1)A/L$. Thus the diameter of a section of stem 43b can be determined for any value of pressure drop P and its distance $d$ can likewise be determined from any other section in the contour, thus completely defining the contour shape that will maintain a constant flow rate R throughout the pressure range designed for, whenever the flow rate is adjusted to R at any value of pressure drop in the design range.

I claim:

1. A fluid flow regulator comprising a main body having a central bore, a plunger operable in said bore, spring means having a chosen load per deflection characteristic and biasing said plunger away from said outlet means, said outlet means including an outlet hole, said plunger including a tapered stem portion extended toward and axially aligned with said outlet hole, there being clearance between the outer end of said tapered stem portion and said outlet hole, said clearance being controlled by the tapered shape and longitudinal position of said tapered stem portion relative to said outlet hole, said plunger including an orifice to permit flow therethrough, a given flow rate through said regulator being correlated with a resultant pressure drop across said plunger orifice and with a specific first force due to said resultant pressure drop tending to move said plunger toward said outlet hole, said plunger being further acted on by a second force in the same said direction due to total pressure drop across the regulator acting on said stem portion, said stem portion having a respective longitudinal position relative to said outlet hole for said given flow rate for each respective value of total pressure drop, due to the combined action of said first and second forces to deflect said spring means a specific amount for each combination of given flow rate and total pressure drop, there being respective values of said clearance corresponding to respective values of total pressure drop that will control said flow to said given rate, said stem portion being so tapered as to provide said respective values of clearance when said stem portion is in each respective longitudinal position corresponding to said given flow rate and to respective values of total pressure drop, the diameter of said plunger is not less than four times nor more than eight times the diameter of said outlet hole, said outlet means further including a threaded outlet stem portion and an external fitting for connection to a fluid line, said outlet means being externally adjustable inward or outward relative to said main body to respectively reduce or increase said flow rate while said fitting is connected or not connected to said fluid line, and further comprising a locking gland to lock said adjustable outlet means against unintended changes in adjustment, said gland including a compression nut and a rubber, or rubberlike, sealing ring, the tightening inward of said compression nut relative to said main body deforming said sealing ring into high pressure contact with said outlet stem at the inner portion of said sealing ring and into high pressure contact with said main body at the periphery of said sealing ring, both of said contacts having high frictional force and thereby causing a locking bond between the outlet stem, sealing ring and main body.

* * * * *